United States Patent
Arai et al.

(10) Patent No.: US 11,638,228 B2
(45) Date of Patent: Apr. 25, 2023

(54) TIME COMPARISON DEVICE AND TIME QUALITY MONITORING METHOD

(71) Applicant: Nippon Telegraph and Telephone Corporation, Tokyo (JP)

(72) Inventors: Kaoru Arai, Musashino (JP); Hiroki Sakuma, Musashino (JP); Masahiro Nakagawa, Musashino (JP); Shunichi Tsuboi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 169 days.

(21) Appl. No.: 17/299,118

(22) PCT Filed: Nov. 28, 2019

(86) PCT No.: PCT/JP2019/046553
§ 371 (c)(1),
(2) Date: Jun. 2, 2021

(87) PCT Pub. No.: WO2020/121824
PCT Pub. Date: Jun. 18, 2020

(65) Prior Publication Data
US 2022/0078736 A1    Mar. 10, 2022

(30) Foreign Application Priority Data

Dec. 11, 2018 (JP) .............................. JP2018-231838

(51) Int. Cl.
*H04W 56/00* (2009.01)
(52) U.S. Cl.
CPC ... *H04W 56/0015* (2013.01); *H04W 56/0055* (2013.01)

(58) Field of Classification Search
None
See application file for complete search history.

(56) References Cited

U.S. PATENT DOCUMENTS 8,699,646 B2 * 4/2014 Olsen ...................... H04L 67/51
370/503
8,913,632 B2 * 12/2014 Aweya .................. H03L 7/0994
370/503

(Continued)

OTHER PUBLICATIONS

[No Author Listed], "IEEE Standard for a Precision Clock Synchronization Protocol for Networked Measurement and Control Systems," IEEE Std 1588-2008, Revision of IEEE Std 1588-2002, Jul. 24, 2008, 290 pages.

(Continued)

*Primary Examiner* — Nicholas Sloms
(74) *Attorney, Agent, or Firm* — Fish & Richardson P.C.

(57) ABSTRACT

[Problem] An object is to obtain a time quality of another GM with high accuracy on the basis of a GM a time quality of which is known already.
[Solution] A first TC 20 includes a time comparison unit 23 that calculates time difference information by comparing first time information of a first PTP processing unit 12 and second time information of a second PTP processing unit 22 with each other. In addition, a quality calculation device 5 measures time difference information until time difference information obtained by a time comparison unit 23 of the first TC 20 and time difference information obtained by a time comparison unit 43 of a second TC 40 match each other, and obtains a GM time quality of a second GM 30 on the basis of a transmission time error of the time transmission network 2 at a timing when both of pieces of the time difference information match each other.

4 Claims, 6 Drawing Sheets

(56) References Cited

U.S. PATENT DOCUMENTS

| | | | | |
|---|---|---|---|---|
| 9,204,408 B2* | 12/2015 | Hirota | ................... | H04B 7/155 |
| 10,084,559 B1* | 9/2018 | Devineni | .............. | H04J 3/0661 |
| 11,477,746 B2* | 10/2022 | Seo | ........................ | H04W 4/46 |
| 2012/0320794 A1* | 12/2012 | Belhadj | ................ | H04J 3/0667 |
| | | | | 370/254 |
| 2013/0003757 A1* | 1/2013 | Boatright | ........... | H04N 21/4381 |
| | | | | 370/474 |
| 2013/0077509 A1* | 3/2013 | Hirota | ................... | H04L 43/106 |
| | | | | 370/252 |
| 2013/0215889 A1* | 8/2013 | Zheng | ................... | H04J 3/0667 |
| | | | | 370/390 |
| 2013/0272352 A1* | 10/2013 | Kamada | ............... | H04L 7/0008 |
| | | | | 375/219 |
| 2014/0122019 A1* | 5/2014 | Turner | ................... | G06F 15/00 |
| | | | | 702/176 |
| 2014/0192826 A1* | 7/2014 | Zampetti | .............. | H04J 3/0658 |
| | | | | 370/503 |
| 2014/0327574 A1* | 11/2014 | Achanta | ................... | H04K 3/90 |
| | | | | 342/357.59 |
| 2016/0149692 A1* | 5/2016 | Kim | ................... | H04L 12/4625 |
| | | | | 370/503 |
| 2017/0350984 A1* | 12/2017 | Nishi | ...................... | G04G 3/02 |
| 2018/0017945 A1* | 1/2018 | Sidhu | .................... | A61G 7/018 |

OTHER PUBLICATIONS

[No Author Listed], "Timing characteristics of primary reference time clocks," Telecommunication Standardization Sector of ITU, TU-T G.8272/Y.1367, Jan. 2015, 26 pages.

\* cited by examiner

TIME COMPARISON DEVICE AND TIME QUALITY MONITORING METHOD

CROSS-REFERENCE TO RELATED APPLICATIONS

This application is a National Stage application under 35 U.S.C. § 371 of International Application No. PCT/JP2019/046553, having an International Filing Date of Nov. 28, 2019, which claims priority to Japanese Application Serial No. 2018-231838, filed on Dec. 11, 2018. The disclosure of the prior application is considered part of the disclosure of this application, and is incorporated in its entirety into this application.

TECHNICAL FIELD

The present disclosure relates to a time comparison device and a time quality monitoring method.

BACKGROUND ART

A time synchronization technique will be needed in the future for cooperation between mobile base stations in the next generation mobile communication 5G (Generation). A time synchronization system is achieved by, for example, a configuration in which grand masters (GM) are arranged at respective sites in a distributed manner. Note that specifications of a primary reference time clock (PRTC) having a GM implemented thereon are defined in Non Patent Literature 1.

A GM at each of the sites functions as a global navigation satellite system (GNSS) receiver that directly receives signals from GNSS satellites and directly distributes the received signals to end applications.
However, when the number of high-performance GNSS receivers is increased, the cost thereof increases accordingly. In addition, time synchronization accuracy deteriorates in a time period in which a signal transmitted from a satellite cannot be received due to bad weather.

Consequently, as a mode in which information transmitted from a GM is distributed through a packet network (that is, a GNSS signal is received indirectly), for example, the precision time protocol (PTP) for performing time synchronization using a time stamp of a packet is used (Non Patent Literature 2). In the PTP, time synchronization is performed through a reliable network of a communication provider.
Thereby, it is possible to aggregate reception sites and installation numbers of GNSS antennas serving as time references and improve the reliability of GNSS reception by providing a monitoring function in an aggregated GNSS receiver (GM). In addition, it is also possible to improve reliability by path duplication of a packet network. Further, a GM superimposes a PTP packet on a main signal, and thus it is possible to transmit time information economically and with an increased time synchronization accuracy.

Figure 7:
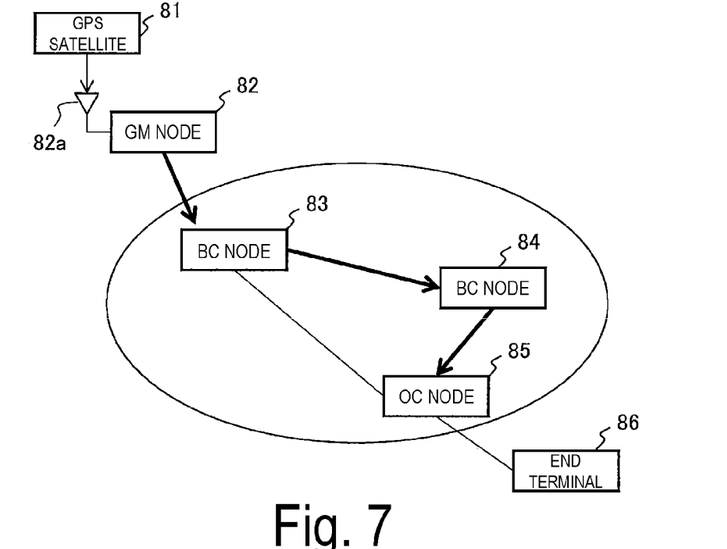
FIG. 7 is a configuration diagram of a time transmission system to which a time synchronization technique according to the present embodiment is applied.
Figure 8:
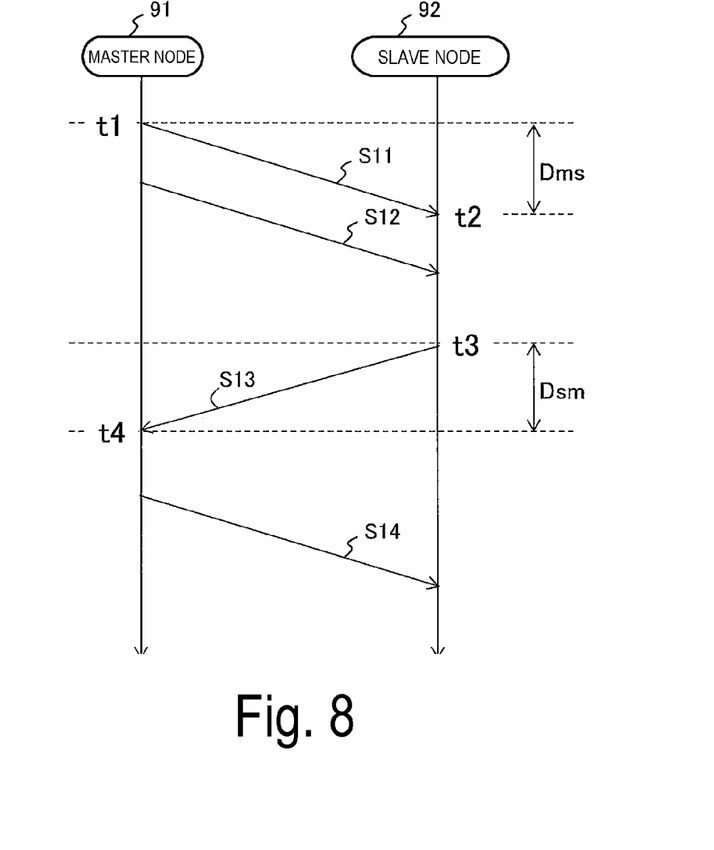
FIG. 8 is a sequence diagram illustrating a structure of the PTP.

FIG. 7 is a configuration diagram of a time transmission system to which a time synchronization technique is applied. The time transmission system is configured such that a GM node 82, boundary clock (BC) nodes 83 and 84, and an ordinary clock (OC) node 85, which are PTP nodes supporting the PTP, are connected to each other through a network.
Of PTP nodes directly performing time synchronization, a node providing time information is hereinafter referred to as a master node 91 (FIG. 8), and anode subjected to synchronization, which receive the time information from the master node 91 is hereinafter referred to as a slave node 92 (FIG. 8). Hereinafter, the order of propagation of time information will be indicated by a bold line arrow in FIG. 7. An arrow base side of the bold line arrow is an upstream side, and an arrow tip side of the bold line arrow is a downstream side. That is, accurate time information is propagated downstream in the order of the GM node 82→the BC node 83→the BC node 84→the OC node 85.

The GM node 82 includes an antenna 82a that directly receives signals transmitted from the GPS satellite 81.
The BC node 83 is a slave node 92 that receives time information from the GM node 82, which is the master node 91, and then functions as a master node 91 that provides the time information to the BC node 84.
The BC node 84 is a slave node 92 that receives the time information from the BC node 83, and then functions as a master node 91 that provides the time information to the OC node 85.
The OC node 85 is a slave node 92 that receives the time information from the BC node 84, and then provides time information to an end terminal 86.
Note that the BC nodes 83 and 84 and the OC node 85 have different names because the BC nodes 83 and 84 include a plurality of connection ports to other PTP nodes and the OC node 85 includes only one connection port.

FIG. 8 is a sequence diagram illustrating a structure of the PTP.
A PTP packet having time information (time stamp) is transmitted and received between the master node 91 and the slave node 92. As a PTP packet, a downstream Sync message (S11), a downstream Follow-up message (S12), an upstream Delay_Request message (S13), and a downstream Delay_Response message (S14) are transmitted and received in order.

A transmission time t1 is a time at which the Sync message (S11) is transmitted from the master node 91. Note that it is difficult to include the transmission time t1 of the Sync message in the Sync message itself, and thus the slave node 92 is notified of the transmission time t1 of the Sync message by the subsequent Follow-up message.
An arrival time t2 is a time at which the Sync message arrives at the slave node 92.
A transmission time t3 is a time at which the Delay_Request message is transmitted from the slave node 92.
An arrival time t4 is a time at which the Delay_Request message arrives at the master node 91. The arrival time t4 is included in the Delay_Response message transmitted in response to the Delay_Request message and notified to the slave node 92.
Thereby, the slave node 92 can obtain all of the four time stamps (the transmission time t1 to the arrival time t4).
The following propagation delay occurs in the transmission and reception of a PTP packet.

A downstream delay Dms is a propagation delay of the Sync message in a downstream direction from the master node 91 to the slave node 92. When a deviation of a clock on the slave node 92 with respect to a clock on the master node 91 side is an offset value, the downstream delay Dms is obtained by the following equation: Downstream Delay Dms=(Arrival Time t2−Offset Value)−Transmission Time t1.

An upstream delay Dsm is a propagation delay of the Delay_Request message in an upstream direction from the slave node 92 to the master node 91. The upstream delay Dsm is obtained by the following equation: Upstream Delay Dsm=Arrival Time t4−(Transmission Time t3−Offset Value).

Assuming that the downstream delay Dms is equal to the upstream delay Dsm, the slave node 92 obtains an offset value by Equation 1 below.

Offset Value=((Arrival Time $t2$–Transmission Time $t1$)–(Arrival Time $t4$–Transmission Time $t3$))/2  (Equation 1)

Then, the slave node 92 corrects the time of its own clock using the obtained offset value, so that the clock of the master node 91 and the clock of the slave node 92 are synchronized with each other (the clock times match).

CITATION LIST

Non Patent Literature

Non Patent Literature 1: ITU-T (International Telecommunication Union Telecommunication Standardization Sector), "Timing characteristics of primary reference time clocks", ITU-T G.8272/Y.1367 Appendix I, January 2015

Non Patent Literature 2: IEEE (The Institute of Electrical and Electronics Engineers, Inc.), "IEEE Standard for a Precision Clock Synchronization Protocol for Networked Measurement and Control Systems", IEEE Std 1588-2008 11 Chapter, AnnexC, Revision of IEEE Std 1588-2002, Jul. 24, 2008

SUMMARY OF THE INVENTION

Technical Problem

There is a possibility that a GM time quality of a GM receiving a coordinated universal time (UTC) from a GPS will vary greatly depending on external conditions. Examples of the external conditions include disturbances such as weather and solar activity, and artificial cases such as malicious jamming. Consequently, a GM time quality is required to be monitored in order to achieve high accuracy in time synchronization regardless of external conditions. Hereinafter, two methods of monitoring a GM time quality will be described.
(Method 1) A method of receiving a UTC from a UTC device other than a GPS and comparing the UTC with a UTC from the GPS. In this case, a GM is connected to a UTC device of a time standard research institution of each country that provides a UTC.
(Method 2) A method of relatively comparing GM time qualities of a plurality of GMs. In a case where a GM time quality of one of two GMs is known already, time information of the one GM may be transmitted to the other GM, and thus it is possible to confirm a relative GM time error of the other GM.

Figure 9:
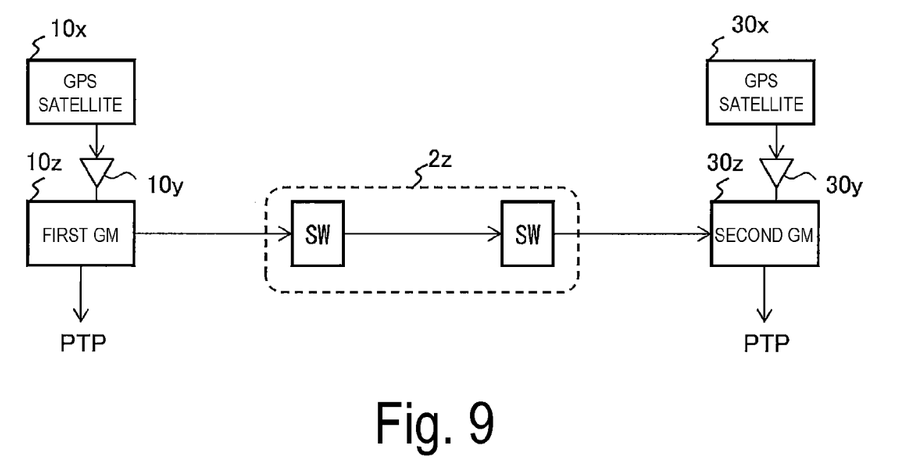
FIG. 9 is a configuration diagram in a case where a second GM is monitored on the basis of a first GM a GM time quality of which is known already.

FIG. 9 is a configuration diagram in a case where a second GM is monitored on the basis of a first GM for which the GM time quality is known already in (Method 2).
Each of a first GM 10z and a second GM 30z operates as a master node and transmits a PTP packet to a slave node (not illustrated) to propagate its own time information to the outside.
It is assumed that the first GM 10z including an antenna 10y directly receiving signals from a GPS satellite 10x has acquired its own GM time quality (hereinafter, a "first GM time quality") by (Method 1), on the basis of a UTC received from a UTC device (not illustrated). This first GM time quality can be obtained with relatively high accuracy.
It is assumed that the second GM 30z including an antenna 30y directly receiving signals from a GPS satellite 30x is time-synchronized with the first GM 10z to obtain its own GM time quality (hereinafter, a "second GM time quality") by (Method 2).
A time transmission network 2z transmits a PTP packet through switches SW between the first GM 10z and the second GM 30z.

Figure 10:
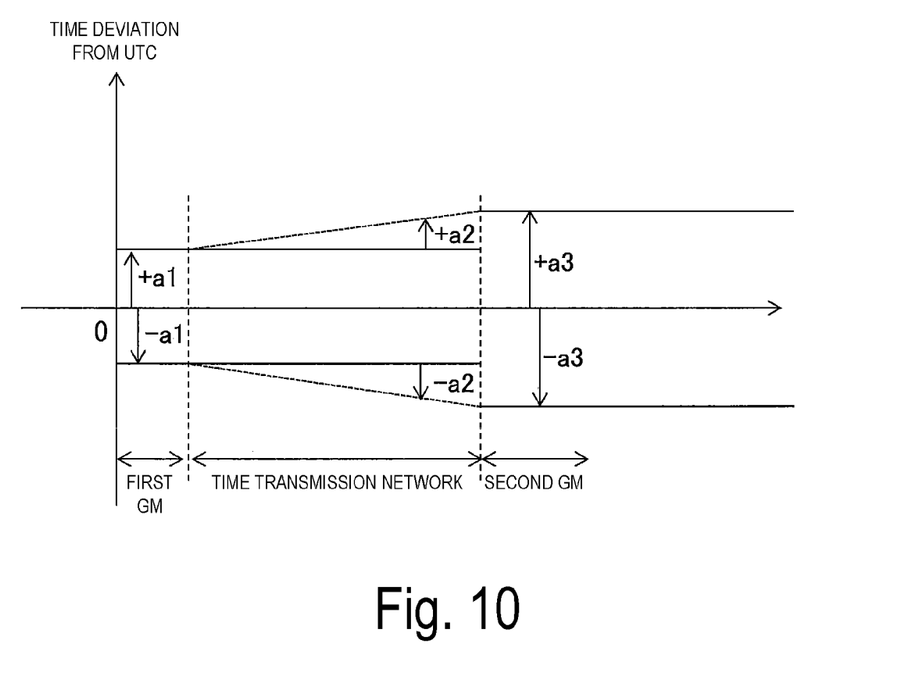
FIG. 10 is a graph illustrating monitoring accuracy between two GMs illustrated in FIG. 9.

FIG. 10 is a graph illustrating monitoring accuracy between the two GMs illustrated in FIG. 9. A horizontal axis in the graph represents a distance from the first GM 10z, and a vertical axis represents a time deviation (GM time error) from the UTC.
The first GM time quality is defined as widths (±a1) of a positive time deviation (+a1) and a negative time deviation (−a1). A transmission time error of the time transmission network 2z is defined as widths (±a2) of a positive time deviation (+a2) and a negative time deviation (−a2). The second GM time quality is defined as widths (±a3) of a positive time deviation (+a3) and a negative time deviation (−a3).
Here, as expressed by Equation 2, a transmission time error of the time transmission network 2z affects monitoring results of the second GM time quality.

(Second GM Time Quality)=(First GM Time Quality)+(Transmission Time Error of Time Transmission Network $2z$)  (Equation 2)

Note that the communication state of the time transmission network 2z varies from time to time due to the degree of congestion of the network, and thus it is difficult to keep track of a transmission time error. Thus, use of a low-accuracy transmission time error deteriorates the monitoring accuracy of the second GM time quality.

Consequently, a principal object of the present disclosure is to obtain a time quality of another GM with high accuracy on the basis of a GM a time quality of which is known already.

Means for Solving the Problem

In order to solve the problem, a time comparison device of the present disclosure has the following features.
The present disclosure is a time comparison device configured to monitor a time quality of a second grand master located on an own device side of a time transmission network through the time transmission network from a first grand master located on an opposite side of the time transmission network, the time comparison device including a first time synchronization unit configured to accept synchronization of first time information from the first grand master by transmitting and receiving a time synchronization packet from the first grand master through the time transmission network, a second time synchronization unit configured to accept synchronization of second time information from the second grand master by transmitting and receiving the time synchronization packet from the second grand master without passing through the time transmission network, a time comparison unit configured to calculate time difference information by comparing the first time information and the second time information with each other, and a quality calculation unit configured to measure the time difference information until the time difference information obtained by the time comparison unit on the own device side and the time difference information obtained by the time comparison unit of the time comparison device on the opposite side match each other, and to obtain the time quality of the second grand master based on a transmission time error of the time transmission network at a timing when both of pieces of the time difference information match each other and the time quality of the first grand master.

Thereby, it is possible to calculate the time quality of the second grand master with high accuracy by using the timing at which the influence of the packet delay variation error in the time transmission network is minimized.

In the present disclosure, the time comparison unit measures the time difference information a plurality of times within a predetermined period of time, and the quality calculation unit obtains the time quality of the second grand master when statistical values of the time difference information measured a plurality of times match each other in both of the pieces of the time difference information.

Thereby, it is possible to appropriately extract the timing at which the influence of the packet delay variation error is minimized even in a situation where the packet delay variation error in the time transmission network fluctuates greatly.

Effects of the Invention

According to the present disclosure, it is possible to obtain a time quality of another GM with high accuracy on the basis of a GM for which a time quality is known already.

DESCRIPTION OF EMBODIMENTS

Hereinafter, an embodiment of the present disclosure will be described in detail with reference to the drawings.

Figure 1:
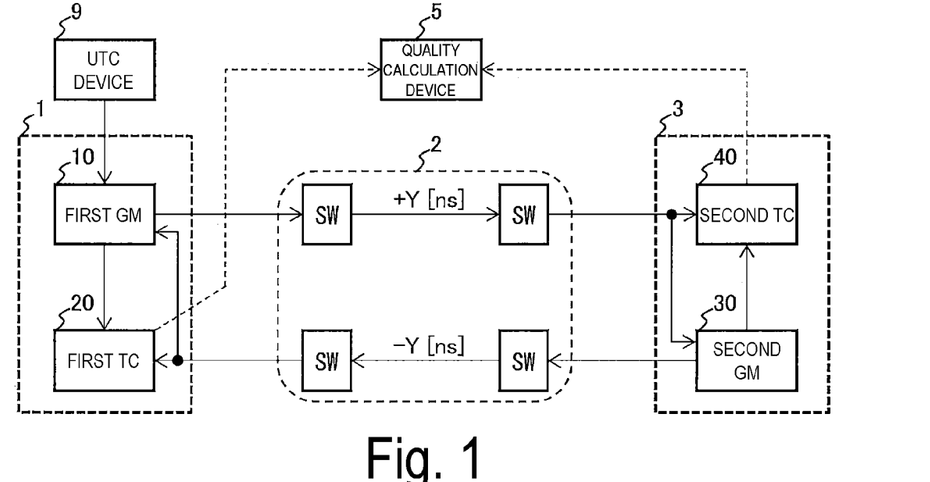
FIG. 1 is a configuration diagram of a time quality monitoring system according to the present embodiment.

FIG. 1 is a configuration diagram of a time quality monitoring system. The time quality monitoring system is configured to include a quality calculation device 5 and a UTC device 9, in addition to a first GM 10, a first TC (time comparison device) 20, a second GM 30, and a second TC (time comparison device) 40 which are connected to each other through a time transmission network 2.

Note that the quality calculation device 5 is described as an independent device in FIG. 1, but may be integrated with a configuration of another device such as the first TC 20. In addition, the first GM 10 and the first TC 20 of a primary network 1 may be configured as one device, and the second GM 30 and the second TC 40 of a secondary network 3 may be configured as one device.

Each of the devices of the time quality monitoring system is configured as a computer including a central processing unit (CPU), a memory, storage means (storage unit) such as a hard disk, and a network interface.

In the computer, the CPU executes a program (also referred to as an application or an app which is an abbreviation thereof) loaded into the memory to operate a control unit (control means) including processing units.

In the time quality monitoring system of FIG. 1, similarly to FIG. 9, the first GM 10 and the second GM 30 each operate as a master node and transmit (transmit and receive) a PTP packet (time synchronization packet) to a slave node (not illustrated) to propagate its own time information to the outside.

The first GM 10 receiving a UTC from the UTC device 9 is time-synchronized with the received UTC, so that the first GM 10 has acquired, as its own time quality, a high first GM time quality in which a deviation from the UTC has been corrected. The second GM 30 is time-synchronized with the first GM 10 to obtain its own second GM time quality.

The time transmission network 2 transmits a PTP packet through switches SW between the first GM 10 and the second GM 30.

Further, compared with the configuration of FIG. 9, the following elements are added to the configuration of FIG. 1. The primary network 1 is a network where the first GM time quality is known already, and accommodates, in addition to the above-described first GM 10, the first TC 20 for comparing time information of both GMs. The secondary network 3 is a network where the second GM time quality is not known yet, and accommodates, in addition to the above-described second GM 30, the second TC 40 for comparing time information of both GMs.

When time synchronization is performed in a direction from the primary network 1 to the secondary network 3, a PTP packet is transmitted in the order of the first GM 10→the switches SW of the time transmission network 2→the second GM 30 and the second TC 40. When time synchronization is performed in a direction from the secondary network 3 to the primary network 1, a PTP packet is transmitted in the order of the second GM 30→the switches SW of the time transmission network 2→the first GM 10 and the first TC 20.

Here, as expressed by Equation 3, which is more detail than Equation 2, components of a transmission time error of the time transmission network 2 includes a link asymmetry error and a packet delay variation error.

(Second GM Time Quality)=(First GM Time Quality)+(Link Asymmetry Error of Time Transmission Network 2)+(Packet Delay Variation Error of Time Transmission Network 2)  (Equation 3)

The link asymmetry error is an error including a +Y [ns] component in a direction from the primary network 1 to the secondary network 3 in FIG. 1 and a −Y [ns] component in a direction from the secondary network 3 to the primary network 1 in FIG. 1. Here, when the PTP is performed in both directions in a case where the link asymmetry errors are fixed in both directions, the signs of the errors are opposite to each other. It is assumed that this link asymmetry error can be obtained in advance.

On the other hand, it is difficult to directly measure the packet delay variation error due to a large time variation. For this reason, the time quality monitoring system further includes the quality calculation device 5.

Figure 4:
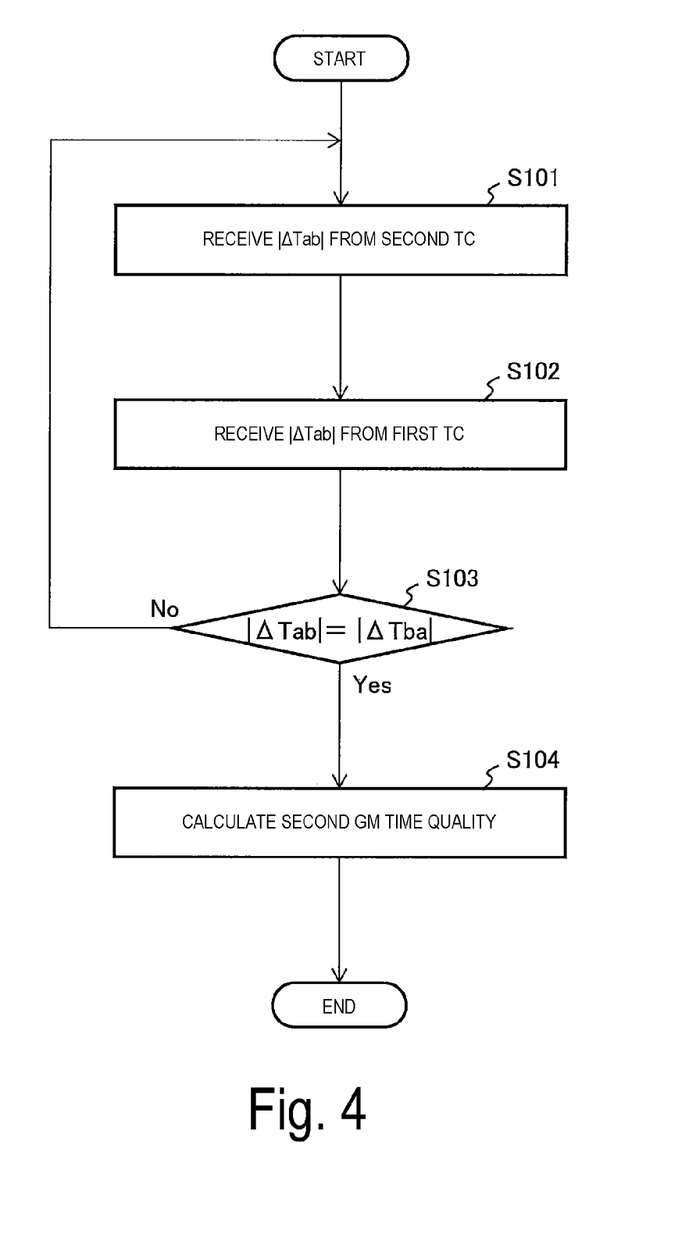
FIG. 4 is a flowchart illustrating processing of a quality calculation device according to the present embodiment.

The quality calculation device 5 obtains a time period in which the packet delay variation error is large and a time period in which the packet delay variation error is small, on the basis of time comparison results obtained from the first TC 20 and the second TC 40 (details are illustrated in FIG. 4). That is, as expressed by Equation 4, the transmission time error of the time transmission network 2 includes almost only the link asymmetry error at a timing when the influence of a packet delay variation error is minimized. The quality calculation device 5 can obtain the second GM time quality with high accuracy by using this timing.

(Second GM Time Quality)=(First GM Time Quality)+(Link Asymmetry Error of Time Transmission Network 2)   (Equation 4)

Figure 2:
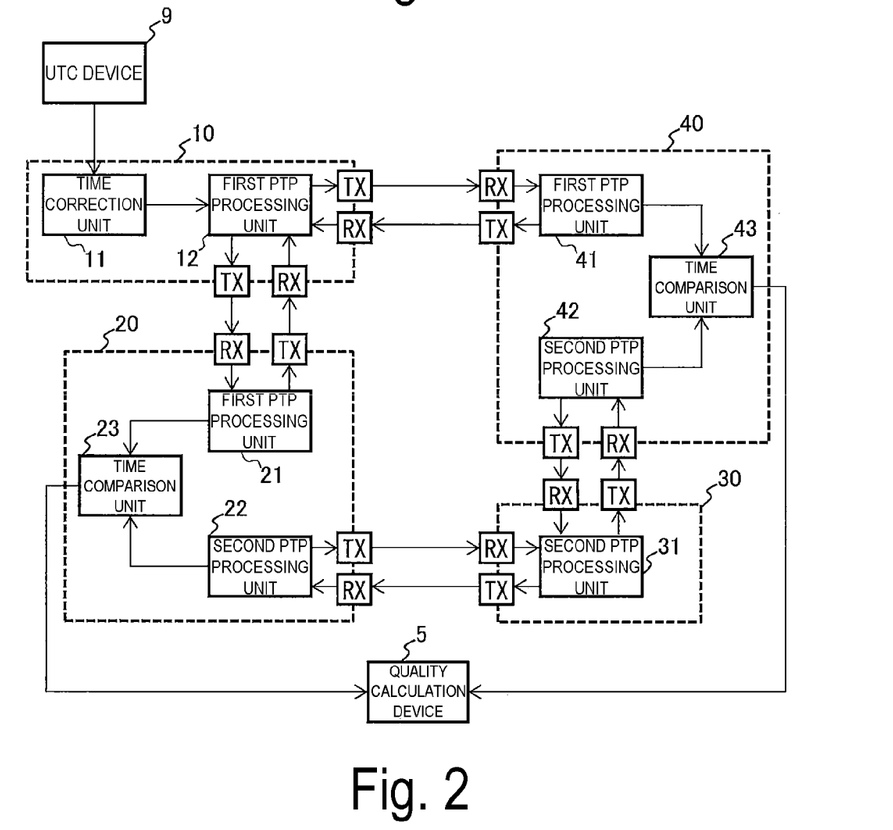
FIG. 2 is a configuration diagram illustrating details of GMs and TCs illustrated in FIG. 1 according to the present embodiment.

FIG. 2 is a configuration diagram illustrating details of the GMs and the TCs illustrated in FIG. 1.

The first GM 10 includes a time correction unit 11 and a first PTP processing unit (first time synchronization unit) 12. The first TC 20 includes a first PTP processing unit (first time synchronization unit) 21, a second PTP processing unit (second time synchronization unit) 22, and a time comparison unit 23. That is, the first TC 20 includes a total of two clocks in the device, that is, a clock for the first PTP processing unit 21 and a clock for the second PTP processing unit 22. The second GM 30 includes a second PTP processing unit (second time synchronization unit) 31. The second TC 40 includes a first PTP processing unit (first time synchronization unit) 41, a second PTP processing unit (second time synchronization unit) 42, and a time comparison unit 43. That is, the second TC 40 includes a total of two clocks in the device, that is, a clock for the first PTP processing unit 41 and a clock for the second PTP processing unit 42.

The first PTP processing unit 12 operating as a master node performs time synchronization on each of the first PTP processing unit 21 and the first PTP processing unit 41 operating as slave nodes by using a PTP packet.

The second PTP processing unit 31 operating as a master node performs time synchronization on each of the second PTP processing unit 22 and the second PTP processing unit 42 operating as slave nodes by using a PTP packet.

These PTP packets are transmitted to the outside through a transmitter TX and received from the outside through a receiver RX.

The time comparison unit 23 compares time information of the first GM 10 obtained from the first PTP processing unit 21 with time information of the second GM 30 obtained from the second PTP processing unit 22, and notifies the quality calculation device 5 of a comparison result. The time comparison unit 43 compares time information of the first GM 10 obtained from the first PTP processing unit 41 with time information of the second GM 30 obtained from the second PTP processing unit 42, and notifies the quality calculation device 5 of a comparison result.

Figure 3:
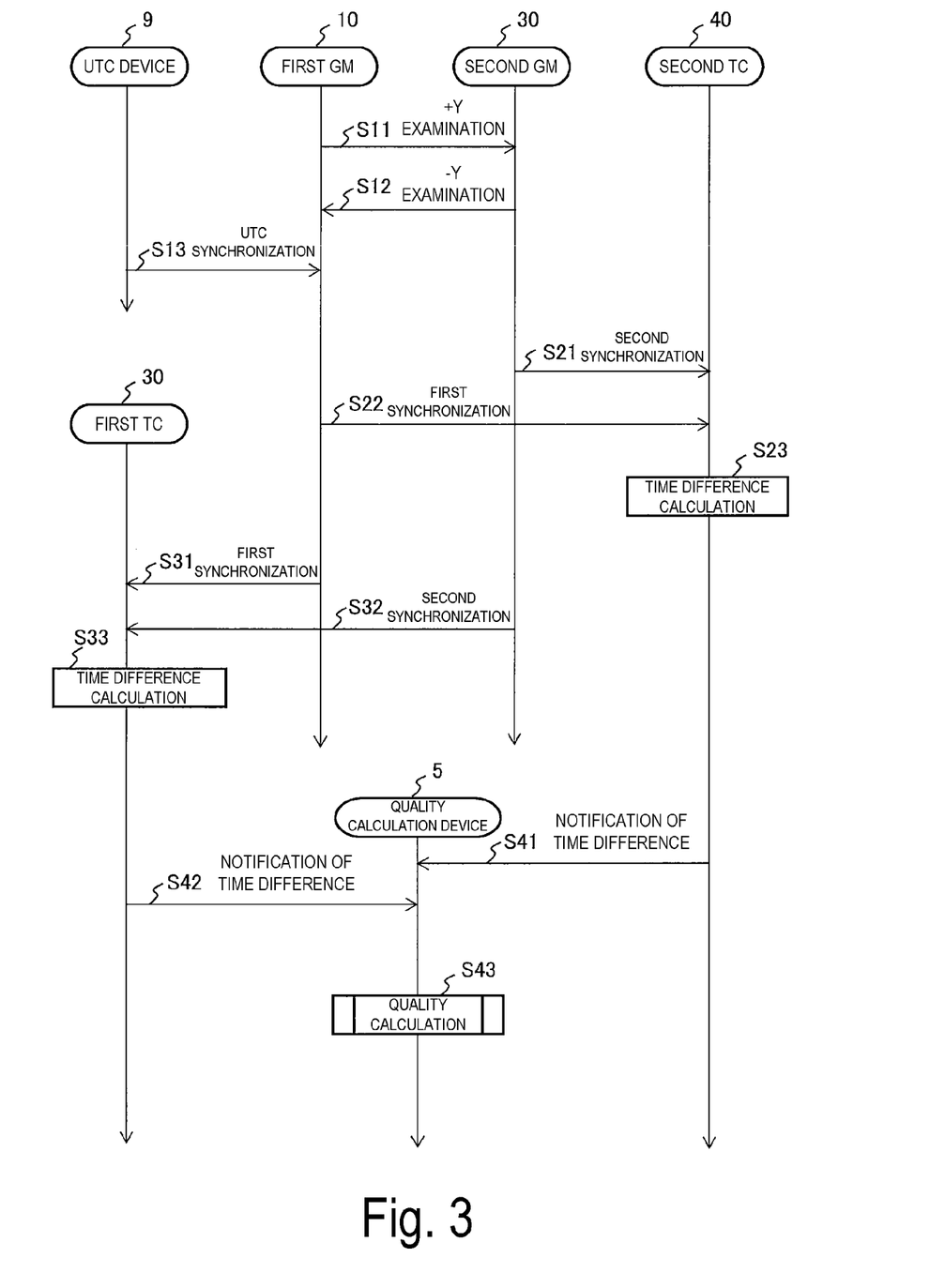
FIG. 3 is a sequence diagram illustrating processing of the time quality monitoring system according to the present embodiment.

FIG. 3 is a sequence diagram illustrating processing of the time quality monitoring system.

As S11, a link asymmetry error (+Y) of the time transmission network 2 directed from the primary network 1 (the first GM 10) to the secondary network 3 (the second TC 40) is obtained through preliminary measurement.

As S12, a link asymmetry error (−Y) of the time transmission network 2 directed from the secondary network 3 (the second TC 40) to the primary network 1 (the first GM 10) is obtained through preliminary measurement.

As S13, the first GM 10 is synchronized with the UTC from the UTC device 9. At this point in time, a deviation of the clock of the first GM 10 from the UTC is corrected, and thus the performance of the clock of the first GM 10 is a first GM time quality.

The second TC 40 acquires, as time information, a PTP synchronization result from the second GM 30 obtained in S21 (here, referred to as "second synchronization") and a PTP synchronization result from the first GM 10 obtained in S22 (here, referred to as "first synchronization"). Then, the second TC 40 calculates an absolute value |ΔTab| of the time difference ΔTab between time information of the first synchronization (first time information) and time information of the second synchronization (second time information) by Equation 5 (S23).

|ΔTab|=|(UTC+Y)−(UTC+X)|=|Y−X|   (Equation 5)

Here, X is a second GM time quality, and Y is a link asymmetry error in S11.

Similarly, the first TC 20 acquires, as time information, a PTP synchronization result from the first GM 10 obtained in S31 and a PTP synchronization result from the second GM 30 obtained in S32. Then, the first GM 10 calculates an absolute value |ΔTba| of a time difference ΔTba between the first synchronization and the second synchronization by Equation 6 (S33).

|ΔTba|=|(UTC+X−Y)−UTC|=|X−Y|   (Equation 6)

The quality calculation device 5 is notified of the absolute value |ΔTab| of the time difference calculated in S23 (S41) and notified of the absolute value |ΔTba| of the time difference calculated in S33 (S42). Then, the quality calculation device 5 calculates a second GM time quality as described later in FIG. 4 (S43).

FIG. 4 is a flowchart illustrating processing of the quality calculation device 5. The quality calculation device 5 receives the absolute value |ΔTba| of the time difference (S101 (S41 in FIG. 3)) and receives the absolute value |ΔTba| of the time difference (S102 (S42 in FIG. 3)).

As S103, the quality calculation device 5 compares |ΔTab| and |ΔTba| to determine whether the values are equal to each other. If |ΔTab| and |ΔTba| are equal to each other (S103, Yes), a packet delay variation error is not included in a transmission time error (in other words, the transmission time error includes only a component of a link asymmetry error), and thus the processing proceeds to S104. In S104, the quality calculation device 5 calculates a second GM time quality on the basis of Equation 4 described above by using a link asymmetry error (Y) at a timing when the influence of the packet delay variation error is minimized. Alternatively, the quality calculation device 5 may calculate a second GM time quality by the calculation expression "(Second GM Time Quality)=|ΔTab|−Y" instead of Equation 4.

On the other hand, if |ΔTab| and |ΔTba| are not equal to each other in S103 (S103, No), the packet delay variation error is included in the transmission time error, and thus the processing returns to S101 to measure a time difference again.

Figure 5:
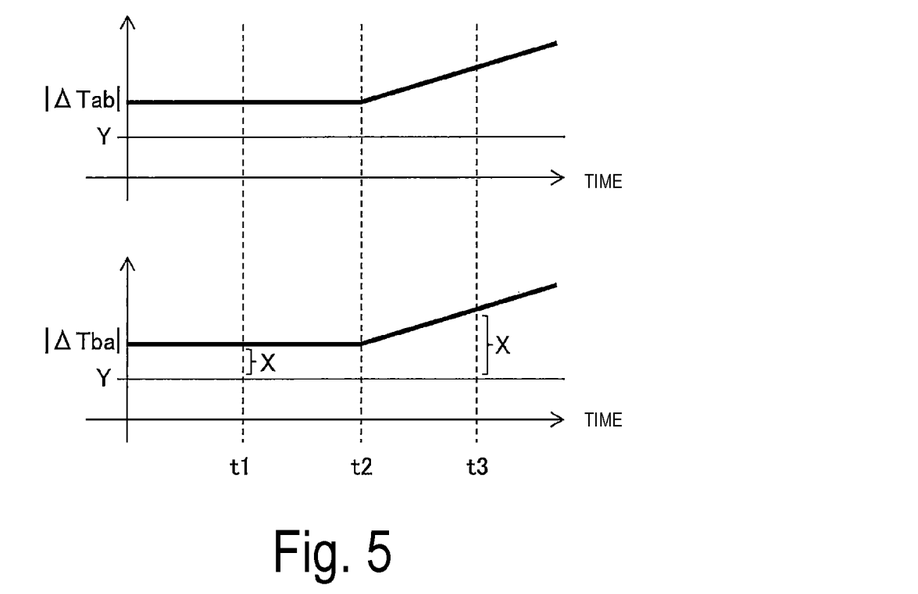
FIG. 5 is a graph in a case in which absolute values of time differences are equal to each other, according to the present embodiment.

FIG. 5 is a graph in a case where the absolute values of the time differences compared in S103 are equal to each other. A horizontal axis in the graph represents a time, and a vertical axis represents an absolute value of a time difference. That is, in FIG. 5, the time difference is measured a plurality of times.

Note that a graph of |ΔTab| and a graph of |ΔTba| are disposed one above the other so that the times match each other, and X and Y in Equation 5 are also written in the graph of FIG. 5.

It is assumed that the absolute values of the time differences represented by the vertical axis in both the graphs are the same fixed value between the time t1 and the time t2 and increase in the same manner from the time T2. That is, a relationship of |ΔTab|=|ΔTba| is satisfied in any time period. In this case, the quality calculation device 5 may compare both graphs with each other using instantaneous values at only the time t1 as the comparison processing in S103, or may compare both graphs with each other using statistical values such as average values between the time t1 and the time t2.

Figure 6:
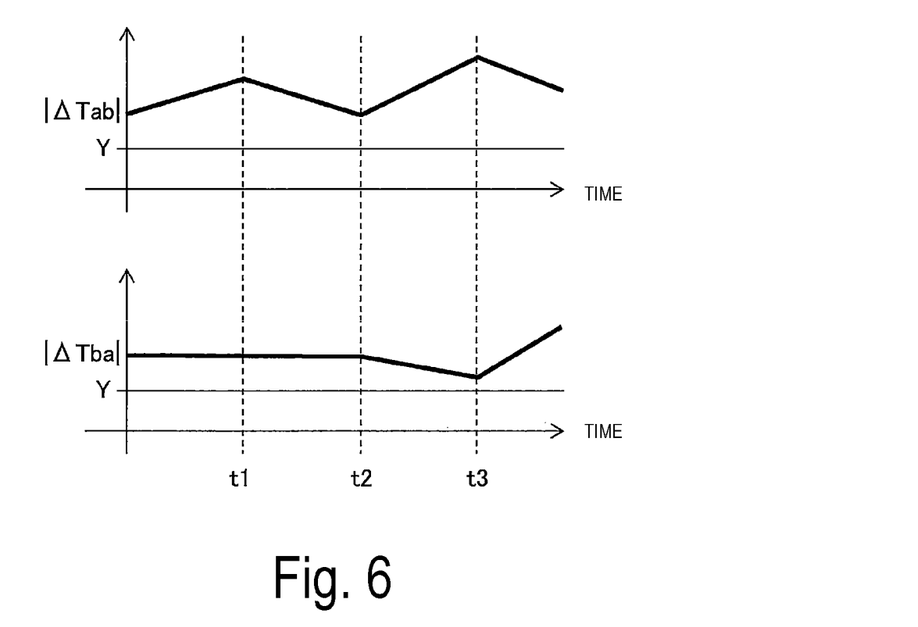
FIG. 6 is a graph in a case where absolute values of time differences are not equal to each other, according to the present embodiment.

FIG. 6 is a graph in a case where the absolute values of the time differences compared with each other in S103 are not equal to each other. Similarly to FIG. 5, the graph of |ΔTab| and the graph of |ΔTba| are disposed one above the other so that the times match each other. In both graphs, a relationship of |ΔTab|=|ΔTba| is mostly not satisfied. It is assumed that the relationship of |ΔTab|=|ΔTba| is satisfied only by instantaneous values at the time t2.

In this case, the quality calculation device 5 compares both graphs using statistical values such as average values between the time t1 and the time t2 as the comparison processing in S103. Thus, even when the relationship of |ΔTab|=|ΔTba| is satisfied only by the instantaneous values at the time t2, the quality calculation device can appropriately cause the processing to return to S101 in FIG. 4 to measure a time difference again.

As illustrated in FIGS. 5 and 6 above, in the processing for comparing |ΔTab| and |ΔTba|=|ΔTab| with each other in S103, it is possible to determine that |ΔTab| and |ΔTba| match each other not only in a case where both values completely match each other (in other words, in a case where a packet delay variation error is zero), but also in a case where a difference between both values is sufficiently small (in other words, in a case where the packet delay variation error is less than a predetermined threshold value).

In the present embodiment described above, the quality calculation device 5 obtains the second GM time quality on the basis of the first GM time quality obtained previously and the link asymmetry error measured previously. Here, the quality calculation device 5 performs measurement until the absolute values of the time differences in both directions become equal to each other (until |ΔTab|=|=ΔTab| is satisfied).

Thereby, the quality calculation device 5 can calculate the second GM time quality with high accuracy by using a timing at which the influence of the packet delay variation error is small.

Further, the quality calculation device 5 can detect an abnormality at a point in time when the obtained second GM time quality exceeds a predetermined threshold value by comparing the second GM time quality with the predetermined threshold value. Thus, when an abnormality is detected, it is possible to rapidly execute a maintenance procedure.

Note that, in the present embodiment, as the time quality monitoring system, a transmission path for passing through two SWs in one direction is described as an example as illustrated in FIG. 1. On the other hand, the number of SWs s is not limited thereto, and any number of SWs may be adopted.

Further, the present embodiment can be implemented by a program causing hardware resources of a general computer to operate as means of the time comparison device and the quality calculation device 5. In addition, this program can be distributed through a communication line or can also be distributed being recorded in a recording medium such as a CD-ROM.

REFERENCE SIGNS LIST

1 Primary network
2 Time transmission network
3 Secondary network
5 Quality calculation device (quality calculation unit)
9 UTC device
10 First GM (first grand master)
11 Time correction unit
12 First PTP processing unit (first time synchronization unit)
20 First TC (time comparison device)
21 First PTP processing unit (first time synchronization unit)
22 Second PTP processing unit (second time synchronization unit)
23 Time comparison unit
30 Second GM (second grand master)
31 Second PTP processing unit (second time synchronization unit)
40 Second TC (time comparison device)
41 First PTP processing unit (first time synchronization unit)
42 Second PTP processing unit (second time synchronization unit)
43 Time comparison unit
81 GPS satellite
82 GM node
82a Antenna
83, 84 BC node
85 OC node
86 End terminal
91 Master node
92 Slave node

The invention claimed is:

1. A time comparison device configured to monitor a time quality of a second grand master located on a host device side of a time transmission network through the time transmission network from a first grand master located on an opposite side of the time transmission network, the time comparison device comprising:

a first time synchronization unit, including one or more processors, configured to accept synchronization of first time information from the first grand master by receiving a first time synchronization packet from the first grand master through the time transmission network;

a second time synchronization unit, including one or more processors, configured to accept synchronization of second time information from the second grand master by receiving a second time synchronization packet from the second grand master without passing through the time transmission network;

a time comparison unit, including one or more processors, configured to calculate time difference information by comparing the first time information and the second time information with each other; and a quality calculation unit, including one or more processors, configured to: determine that i) the time difference information obtained by the time comparison unit on the host device side and ii) another time difference information obtained by another time comparison unit of another time comparison device on the opposite side match each other, and in response to determining that i) the time difference information and ii) the another time difference information match each other, to obtain a time quality of the second grand master based on a) a transmission time error of the time transmission network at a timing when both the time difference information and the another time difference information match each other and b) a time quality of the first grand master.

2. The time comparison device according to claim 1, wherein the time comparison unit is configured to measure the time difference information and the another time difference information a plurality of times within a predetermined period of time, and the quality calculation unit is configured to obtain the time quality of the second grand master when statistical values of i) the time difference information and ii) the another time difference information measured a plurality of times match each other.

3. A time quality monitoring method performed by a time comparison device configured to monitor a time quality of a second grand master located on a host device side of a time transmission network through the time transmission network from a first grand master located on an opposite side of the time transmission network, the time comparison device including a first time synchronization unit including one or more processors, a second time synchronization unit including one or more processors, a time comparison unit including one or more processors, and a quality calculation unit including one or more processors, the time quality monitoring method comprising:

by the first time synchronization unit, accepting synchronization of first time information from the first grand master by receiving a first time synchronization packet from the first grand master through the time transmission network;

by the second time synchronization unit, accepting synchronization of second time information from the second grand master by receiving a second time synchronization packet from the second grand master without passing through the time transmission network;

by the time comparison unit, calculating time difference information by comparing the first time information and the second time information with each other; and by the quality calculation unit, determining that i) the time difference information obtained by the time comparison unit on the host device side and ii) another time difference information obtained by another time comparison unit of another time comparison device on the opposite side match each other, and in response to determining that i) the time difference information and ii) the another time difference information match each other, obtaining a time quality of the second grand master based on a) a transmission time error of the time transmission network at a timing when both the time difference information and the another time difference information match each other and b) a time quality of the first grand master.

4. The time quality monitoring method according to claim 3, further comprising:

by the time comparison unit, measuring the time difference information and the another time difference information a plurality of times within a predetermined period of time; and by the quality calculation unit, obtaining the time quality of the second grand master when statistical values of i) the time difference information and ii) the another time difference information measured a plurality of times match each other.

* * * * *